(12) United States Patent
Klammer

(10) Patent No.: US 6,227,775 B1
(45) Date of Patent: May 8, 2001

(54) INTERNAL GEARS AND SPLINES AND MILLING METHOD AND APPARATUS FOR MANUFACTURING SAME

(76) Inventor: Arnold F. Klammer, 1125 E. Dunkerton Rd., Cedar Falls, IA (US) 50613

( * ) Notice: Subject to any disclaimer, the term of this patent is extended or adjusted under 35 U.S.C. 154(b) by 0 days.

(21) Appl. No.: 09/270,963

(22) Filed: Mar. 17, 1999

(51) Int. Cl.[7] ................. B23F 1/06; B23F 15/00
(52) U.S. Cl. ................. 409/26; 409/25; 409/38; 409/41; 409/50; 409/51; 451/47; 451/147
(58) Field of Search ................. 409/38–42, 25, 409/28, 44, 26, 46, 47, 51, 50; 451/363, 340, 123, 47, 219, 147

(56) References Cited

U.S. PATENT DOCUMENTS

| | | | |
|---|---|---|---|
| 1,963,753 | * 6/1934 | Merz | 409/56 |
| 2,665,612 | * 1/1954 | Nübling | 409/51 X |
| 3,570,367 | 3/1971 | Looman et al. | |
| 3,673,660 | * 7/1972 | Osplack et al. | 409/51 X |
| 3,916,569 | * 11/1975 | Wydler et al. | 451/123 |
| 3,931,754 | 1/1976 | Nishijima et al. | |
| 4,058,938 | * 11/1977 | Härle et al. | 409/33 |
| 4,066,001 | 1/1978 | Nishijima et al. | |
| 4,083,152 | * 4/1978 | Lorenz | 451/363 |
| 4,130,967 | * 12/1978 | Easton et al. | 451/72 |
| 4,534,684 | 8/1985 | Johnson . | |
| 4,543,020 | * 9/1985 | Shtipelman | 409/51 X |
| 4,735,019 | * 4/1988 | Wiederkehr | 451/340 |
| 4,798,504 | * 1/1989 | Erwin et al. | 409/41 X |

FOREIGN PATENT DOCUMENTS

| | | | |
|---|---|---|---|
| 2630406 | * 2/1977 | (DE) | 409/38 |
| 961875 | * 9/1982 | (SU) | 409/41 |

* cited by examiner

Primary Examiner—William Briggs
(74) Attorney, Agent, or Firm—Simmons, Perrine, Albright & Ellwood PLC

(57) ABSTRACT

An apparatus and method for milling internal gears and splines using a pair of opposed milling cutters disposed internally in a gear or spline blank. The apparatus generally milling gear teeth on generally opposite sides of the blank with an indexing mechanism for manipulating the orientation of the milling apparatus with respect to the blank. Also disclosed are internal gears having milled teeth which are manufactured using the apparatus and the method.

16 Claims, 2 Drawing Sheets

US 6,227,775 B1

INTERNAL GEARS AND SPLINES AND MILLING METHOD AND APPARATUS FOR MANUFACTURING SAME

FIELD OF THE INVENTION

The present invention generally relates to the internal gears and splines and more particularly also relates to the manufacture of internal gears and splines, i.e. gears and splines having a central toothed bore.

BACKGROUND OF THE INVENTION

In the past, internal gears and splines have been predominantly manufactured with two cutting methods: broaching and shaping.

Broaching involves the use of a broach, an elongated cutting tool having a series of cutting surfaces of increasing size. The broach is passed through the gear bore with the first cutting surface engaging the bore of the blank and thereby removing a small amount of material. With the passage of each successive cutting surface, with their increasing sizes, the length of the gear or spline teeth being made increases. Typically, when the broach passes completely through the bore, the gear or spline has been cut.

Shaping is a process which involves using a shaper-cutter tool which resembles, in appearance, a gear and a machine to manipulate this shaper-cutter tool. Shaping uses a reciprocating motion to cut. For every stroke of a cutter ram, the shaper-cutter tool travels through the bore, taking a slight cut. It then retracts from the edge of the bore and returns to the top of the stroke cycle and repositions itself for the next cutting stroke. This process is repeated until the desired tooth size is reached.

While both broaching and shaping have been successfully used to cut internal gears and splines in the past, they each have drawbacks. Broaches are typically quite expensive. They are often custom built to meet the peculiar needs of a particular gear- and spline-cutting job. They require frequent sharpening and have a limited useful life. Shaping cutters also require frequent sharpening and are relatively slow cutting, owing to the fact that they cut only during portions of one stroke. Because of this, they are actually cutting less than 50 percent of the time they are in operation.

Consequently, there exists a need for improved methods and apparatuses for manufacturing internal gears and splines.

SUMMARY OF THE INVENTION

It is an object of the present invention to provide an economical approach to cutting internal gears and splines.

It is a feature of the present invention to include a milling apparatus for internal gear and spline cutting.

It is an advantage of the present invention to use a relatively inexpensive cutting tool surface.

It is another advantage of the present invention to allow for an increased duty cycle during which cutting actually occurs.

It is another object of the present invention to provide a versatile approach to cutting internal gears and splines.

It is another feature of the present invention to provide an adjustable milling apparatus.

It is another advantage of the present invention to provide a relatively easy approach to vary the size, shape, spacing and number of teeth in an internal gear or spline.

The present invention is a method and apparatus for cutting internal gears and splines which is designed to satisfy the aforementioned needs, produce the previously stated objects, include the above-listed features, and achieve the already articulated advantages.

Accordingly, the present invention is a milling apparatus where the cutting surface is disposed inside the bore of an internal gear or spline. The present invention is also a method of manufacturing internal gears and splines using such a milling apparatus and an internal gear or spline manufactured with such method using such milling apparatus.

BRIEF DESCRIPTION OF THE DRAWINGS

The present invention may be more fully understood by reading the following description of the preferred embodiments of the invention in conjunction with the appended drawings, wherein.

DETAILED DESCRIPTION OF THE DRAWINGS

Figure 1:
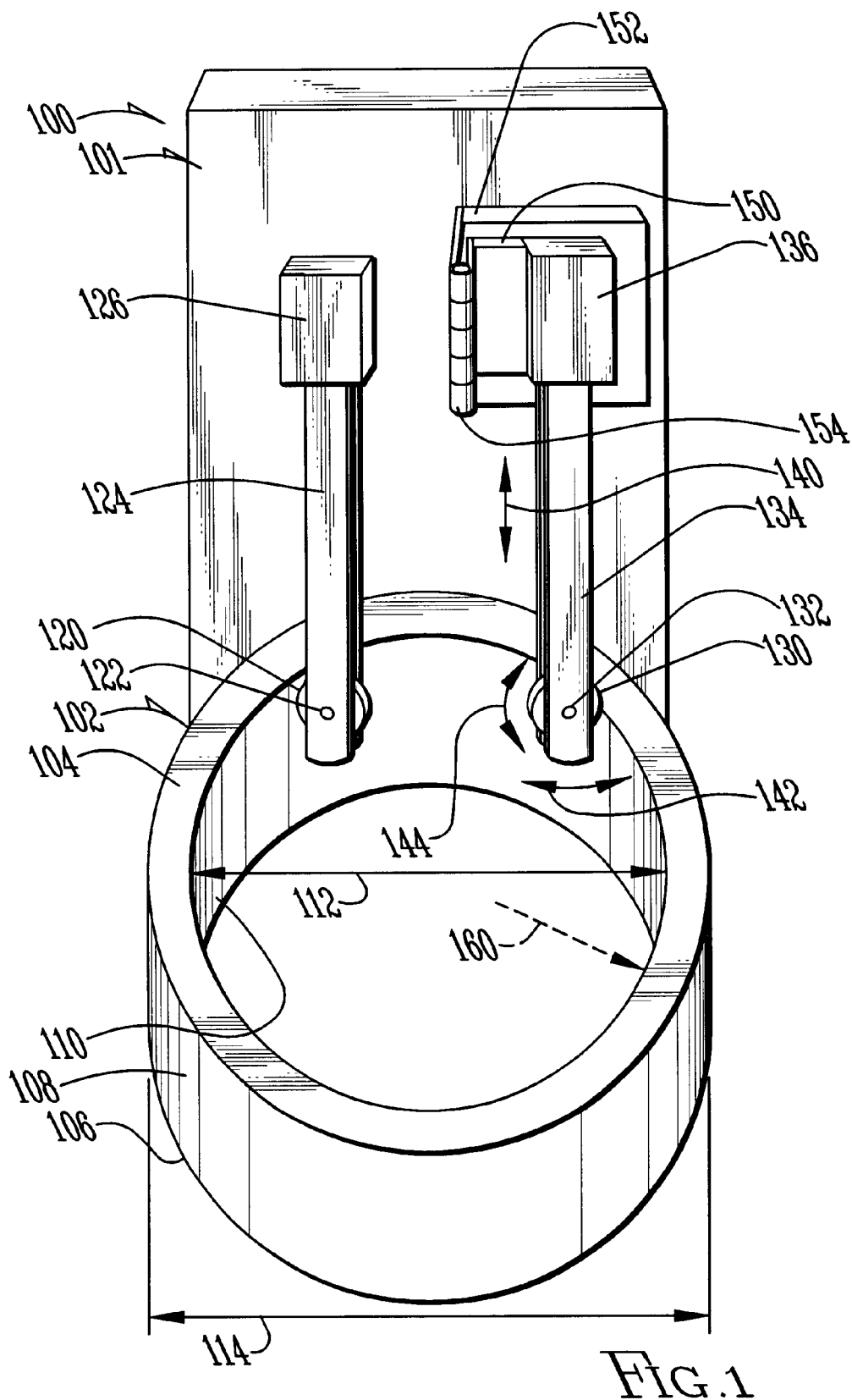
FIG. 1 is a perspective view of the apparatus of the present invention, together with a gear blank.

Now referring to the drawings, wherein like numerals refer to like matter throughout, and more particularly to FIG. 1, there is shown a perspective view of the apparatus of the present invention, generally designated 100, having a support frame 101, together with a gear blank 102. Throughout this description reference is made to cutting internal gears. The present invention relates to cutting splines as well. The use of terminology herein towards internal gears is merely an example. It is intended to refer to splines as well. Gear blank 102 is the workpiece upon which the apparatus of the present invention 100 operates upon to create an internal gear. Gear blank 102 has a gear blank top edge 104, a gear blank bottom edge 106, a gear blank outside surface 108 and a gear blank inside surface 110. Gear blank 102 further has a gear blank inside bore diameter 112 and a gear blank exterior diameter 114. The gear blank 102 is representative of countless possible gear blank types which could be utilized to manufacture countless types and sizes of internal gears. The dimensions and materials of gear blank 102 are variable, depending upon the design and use of the ultimately desired gear.

Apparatus 100 is shown having a first milling tool 120, which is used for engaging and cutting the gear blank 102. First milling tool 120 rotates around a first milling tool axis 122. Preferably, the first milling tool 120 is removable and readily replaceable with other milling tools. The size, shape and dimensions of first milling tool 120 are dependent upon the size, shape and dimensions of the teeth in the desired internal gear. A first milling tool arm 124 is shown coupled with and supporting first milling tool axis 122 and first milling tool 120. The existence, length, dimension and materials of first milling tool arm 124 are a function of the designers' choices and are related to the overall construction of the first milling tool drive assembly 126, which may include an electric motor or other drive devices, such as belts, chains, shafts, etc., which can transfer power from a motor to the milling tool 120.

Also shown in FIG. 1 is a second milling tool 130, a second milling tool axis 132, a second milling tool arm 134, and a second milling tool drive assembly 136, which are similar to first milling tool 120, first milling tool axis 122, first milling tool arm 124, and first milling tool drive assembly 126 respectively. Second milling tool drive assembly 136 is shown having several directions of motion for adjustment and operation. Vertical gear height adjustment 140 represents the direction of motion of first milling tool drive assembly 126 and second milling drive assembly 136 during the cutting process. Horizontal gear depth adjustment direction 142 represents the direction of motion of first milling tool arm 124 and second milling tool arm 134, depending upon the desired depth of the teeth in the desired gear. Rotation direction of second milling tool 144 is also shown.

Second milling tool drive assembly 136 is shown mounted to a mounting bracket 150, which is coupled to a hinge spacer 152 and ultimately coupled to a hinge 154. Second milling tool drive assembly 136 is capable of pivoting away from frame 101 and around hinge 154, so that second milling tool is not arranged in a parallel configuration with first milling tool 120. Line 160 represents a potential alternate cutting direction line which would occur when second milling tool drive assembly 136 is pivoted away from frame 101. The materials, dimensions, shapes and other details of components of the present invention 100 are largely a matter of the choice of any particular designer. If the gear blank 102 is a relatively small plastic gear, then the size, material, shape, construction, etc. of device 100 will be different from the size, shape, construction, etc. of a device optimized for creating internal gears made of steel for use in heavy machinery, such as tractors, earth-moving equipment, etc. FIG. 1 shows a configuration where the gear blank 102 is relatively fixed and the first and second milling tool drive assembles 126 and 136 respectively are movable with respect to the gear blank 102. However, alternate configurations in which the gear blank is movable and the apparatus 100 of the present invention is fixed are alternate embodiments. Similarly, the horizontal gear depth adjustment direction 142 may be a pivoting motion of the second milling tool drive arm 134, or it may be resulting from translational motion of second milling tool arm 134 with respect to the gear blank 102. First milling tool axis 122 is preferably parallel with the top edge 104 and perpendicular to an inside bore diameter 112. Mounting bracket 150, hinge spacer 152 and hinge 154 are merely representative of various types of arrangements in which second milling tool drive assembly 136 or first milling tool drive assembly 126 can be caused to be moved from a parallel configuration so that a gear having an odd number of teeth may be cut. The purpose of hinge spacer 152 is to facilitate the adjustment of second milling tool drive assembly 136, so that the alternate cutting direction line 160 extends to a center point along the inside bore diameter 112.

Figure 2:
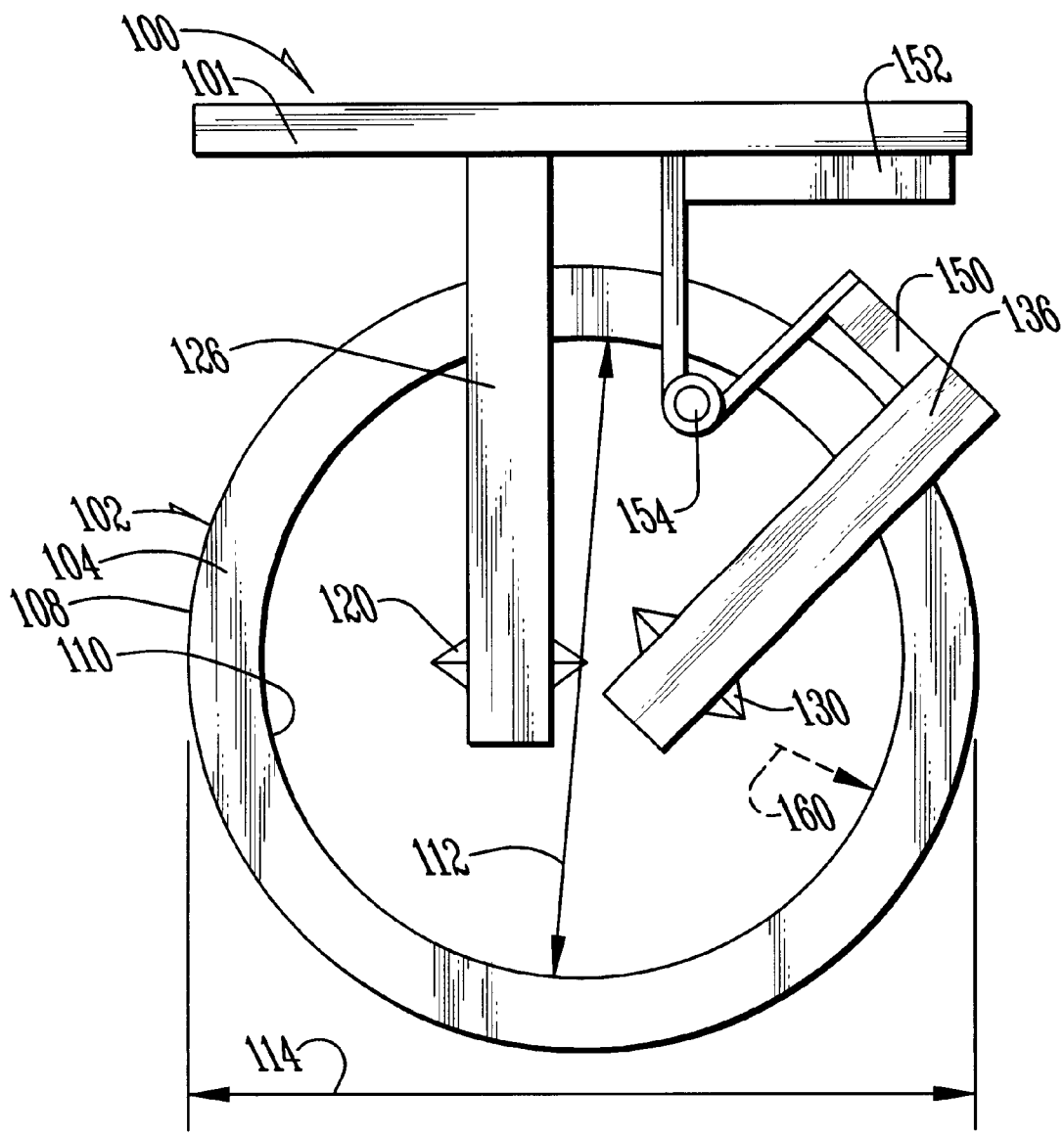
FIG. 2 is a top view of the present invention showing the second milling assembly 136 oriented in a non-parallel configuration with respect to milling assembly 126.

Now referring to FIG. 2, there is shown the apparatus 100 of the present invention and of FIG. 1 from a top viewpoint in which the second milling tool drive assembly 136 is pivoted to a non-parallel orientation with respect to the first milling tool drive assembly 126. Mounting bracket 150 is clearly shown pivoted away from frame 101, thereby aligning second milling tool 130 to be in alignment with alternate cutting direction line 160, to facilitate cutting gears having an odd number of teeth.

In operation, the present invention 100 is used for cutting an interior gear into a gear blank 102. First and second milling tools 120 and 130 respectively are caused to rotate around axes 122 and 132 respectively. Tools 120 and 130 are caused to engage the interior surface 110 of gear blank 102 and the tools 120 and 130 are caused to move with respect to each other to effect the gear cutting operation, the vertical gear height adjustment, and the horizontal gear depth adjustment. The gear blank and first milling assembly 126 are capable of indexed relative motion with respect to each other for successively cutting a series of adjacent gear teeth around the inside surface 110 of gear blank 102. This indexing motion may be a result of moving the gear blank 102 a predetermined amount or conversely by rotating the apparatus 100 about the gear blank 102.

When second milling tool drive assembly 136 is pivoted to an alternate cutting direction line 160, for the purpose of cutting an odd number of teeth in the gear blank 102, and the gear blank 102 is indexed, so that first milling tool 120 cuts gear teeth around the inside surface 110 until first milling tool 120 reaches a position on the inside surface 110 in which a gear tooth has already been cut by second milling tool 130. In this situation, second milling tool 130 would have cut an equal number of teeth on the inside surface 110, less one tooth because in such situations, the last cutting action would be attempting to cut a tooth already cut by first milling tool 120.

It is thought that the method and apparatus of the present invention will be understood from the foregoing description, and it will be apparent that various changes may be made in the form, construction, steps and arrangement of the parts and steps thereof without departing from the spirit and scope of the invention or sacrificing all other material advantages, the form herein described being merely a preferred or exemplary embodiment thereof.

I claim:

1. An apparatus for cutting inside a bore of a blank, having a bore diameter and an inside cylindrical surface, having a bore height, the apparatus comprising:

a first milling assembly, disposed inside said bore of said blank, said assembly having a first rotating milling tool for cutting teeth in said inside cylindrical surface;

said first rotating milling tool rotates about an axis which is perpendicular to a bore diameter line and a line of vertical gear height adjustment; and, a second milling assembly, disposed inside said bore of said blank, said second milling assembly being mounted on a vertically aligned hinge for pivoting and having a second rotating milling tool for cutting teeth in said inside cylindrical surface.

2. An apparatus of claim 1 wherein said first milling assembly and said second milling assembly are configured for relative adjustment with respect to each other so as to be deployed on non-parallel bore diameter lines.

3. An apparatus of claim 1 wherein said first milling assembly and said second milling assembly are disposed along a bore diameter line of said blank and are movable along said bore diameter line.

4. An apparatus of claim 1 wherein said first milling assembly and said second milling assembly are not both disposed on said bore diameter line.

5. An apparatus of claim 1 wherein said second milling assembly is mounted on a pivotable mount so that said second milling assembly can be oriented at an oblique angle with respect to said first milling assembly.

6. An apparatus of claim 1 wherein said second milling assembly is mounted on a hinged member.

7. An apparatus of claim 1 wherein a spline is cut from said blank.

8. A method of cutting teeth inside a blank having a bore therein, the bore having a bore diameter line, the method comprising the steps of:

providing a first rotating cutting tool;

positioning said first rotating cutting tool inside said bore to a first predetermined position on said bore diameter line;

engaging said first rotating cutting tool with said blank so that material is removed from said blank at said first predetermined position;

disengaging said first rotating cutting tool from said bore;

repositioning said first rotating cutting tool to a second predetermined position inside said bore, and along a bore diameter line, by causing relative revolutionary motion to occur between said first cutting tool and said blank around a bore axis which is perpendicular to a diameter line of said bore;

engaging said first rotating cutting tool with said bore so that material is removed from said blank at said second predetermined position, and providing a second rotating cutting tool mounted on a milling assembly, said milling assembly being mounted on a vertically aligned hinge for pivoting.

9. A method of claim 8 wherein said blank is a spline blank.

10. A method of claim 8 wherein said second rotating cutting tool is co-linear with said first rotating cutting tool.

11. A method of claim 8 wherein said second rotating cutting tool is not co-linear with said first rotating cutting tool.

12. A method of claim 8 wherein said step of engaging said first rotating cutting tool includes moving said first rotating cutting tool in a direction which is parallel with said bore axis.

13. A method of claim 12 wherein said first rotating cutting tool rotates around an axis which is perpendicular to said bore axis.

14. An apparatus for cutting gear teeth on an inside surface of a bore of a gear blank comprising:

first means for milling material from said gear blank at a predetermined location, on a diameter line of said bore, inside of said gear blank a second means for milling material from said gear blank at a predetermined location inside said gear blank, means for adjusting an orientation characteristic of said second means for milling so as to be oriented along an alternate cutting direction line which is not co-linear with said diameter line, and said second means being supported by a second milling assembly mounted on a vertically aligned hinge for pivoting.

15. A method of claim 8 wherein said second rotating cutting tool is mounted on a movable member, so that said second rotating cutting tool can be oriented for use on a line at an oblique angle with respect to said bore diameter line and said first rotating cutting tool.

16. A method of claim 8 wherein said second rotating tool is mounted on a hinge.

* * * * *